H.T. SZOSTAK
G.A. BIGHAM
INVENTOR.

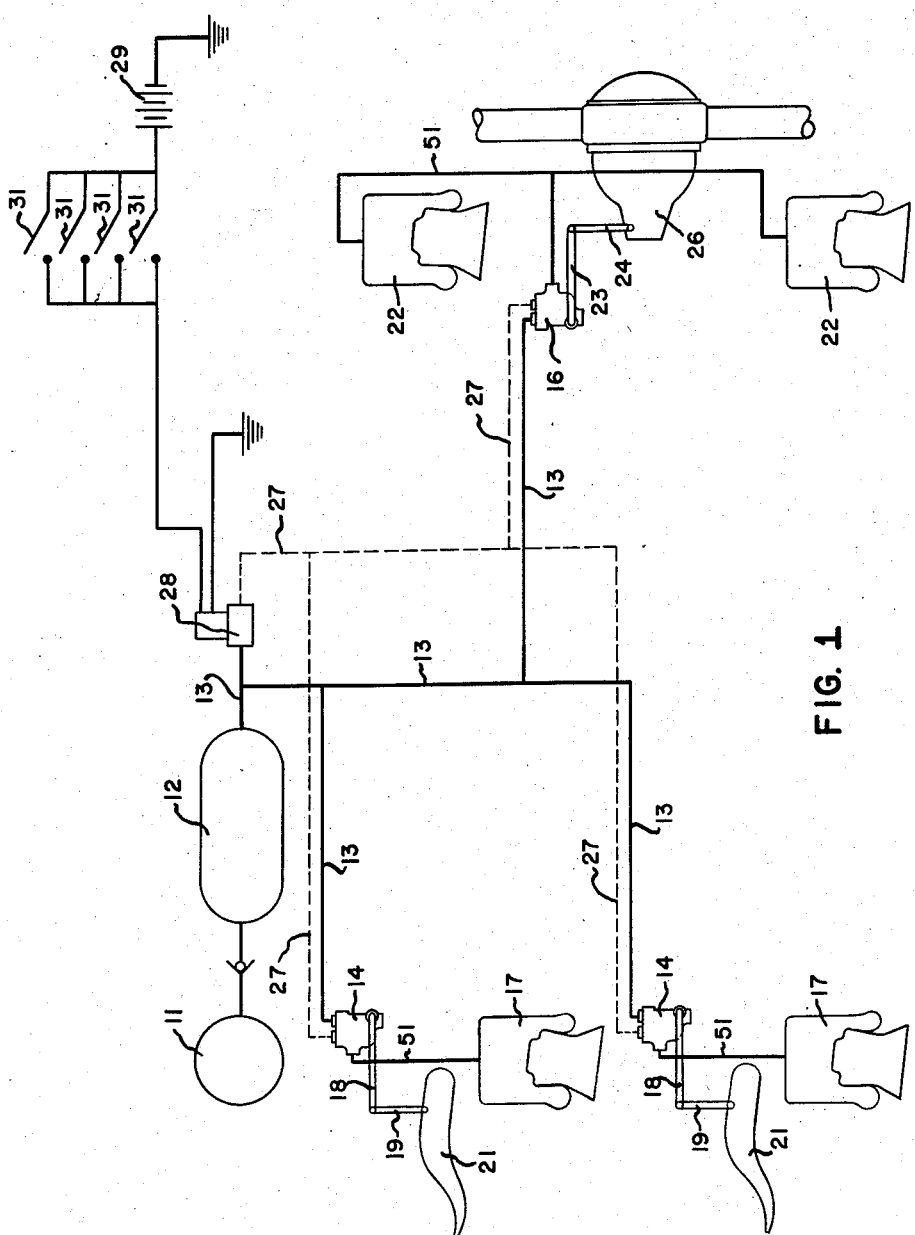

2,925,284

MOTOR VEHICLE AIR SUSPENSION SYSTEM

Henry T. Szostak, Dearborn, and George A. Bigham, Garden City, Mich., assignors to Ford Motor Company, Dearborn, Mich., a corporation of Delaware Application March 7, 1957, Serial No. 644,622

10 Claims. (Cl. 280—124)

This invention relates generally to an air suspension system for a motor vehicle, and particularly to the leveling mechanism for the system.

An object of the present invention is to provide an air suspension system for a motor vehicle incorporating leveling mechanism automatically maintaining a predetermined relationship between the vehicle chassis and the road wheels regardless of the load on the vehicle. A further object is to provide, in a system of this type, leveling mechanism in which the filling and exhausting of the air springs may be selectively effected at different air flow rates by meanse of control valve means located between each leveling valve and the air spring associated therewith.

In an embodiment of the invention, this is accomplished by means of a control valve connected between the leveling valve and the air spring and having two positions, namely, a first position permitting continuous air flow at a relatively slow rate, and a second position permitting air flow at a faster rate. The slow air rate may be utilized for continuous leveling and the fast rate for intermitting leveling as, for example, when a vehicle door is open.

A further object of the invention is to provide a single control valve adapted to control not only the fill rate, but also the exhaust rate of the air spring. Still another object is to provide a control valve of this type associated with each leveling valve, and remotely controlled by means of a signal transmitted by air pressure when a change in the flow rate is desired.

Other objects and advantages of this invention will be made more apparent as this description proceeds, particularly when considered in connection with the accompanying drawings, wherein:

Figure 1 is a diagrammatic view of the air suspension system of the present invention;

Figure 2:
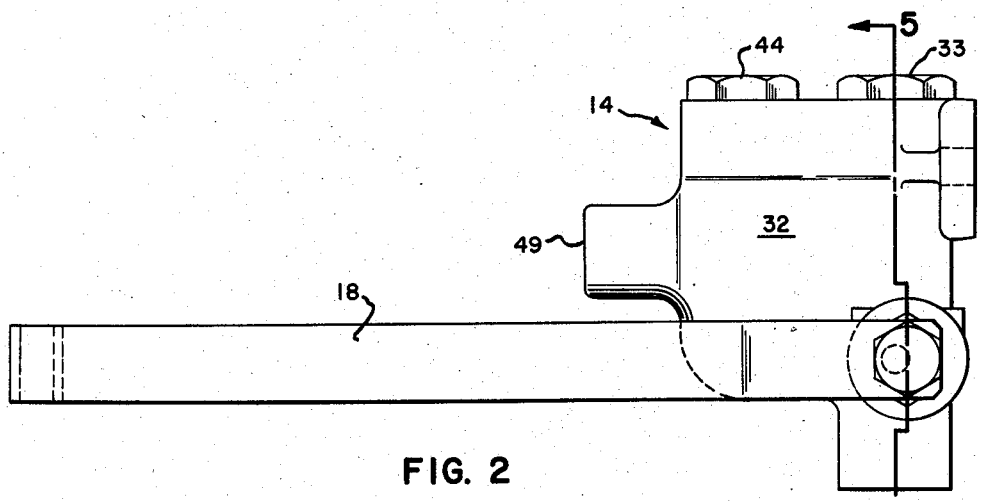
Figure 2 is an enlarged side elevational view of one of the leveling valves.
Figure 1A:
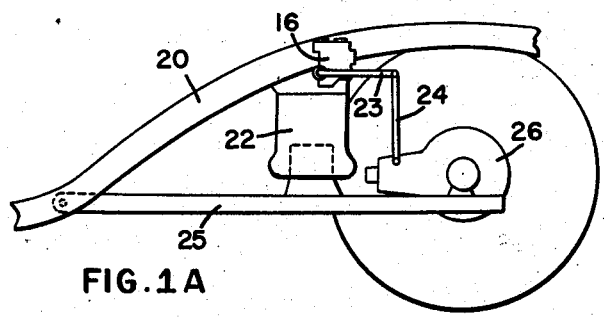
Figure 1A is a semi-diagrammatic side elevational view of a portion of a vehicle chassis incorporating the system.

Referring now to the drawings, and particularly to Figure 1, the reference character 11 indicates an air compressor adapted to charge an air storage tank 12, which in turn supplies air under pressure to supply conduits 13 leading to a pair of front leveling valves 14 and a single rear leveling valve 16.

The front leveling valves 14 control the supply of air to, and the exhausting of air from, front air springs 17 conventionally mounted between the vehicle frame and a lower front suspension member (not shown). Each front leveling valve is connected by means of an arm 18 and a link 19 to an upper suspension arm 21 so that the leveling valve will be responsive to changes in the relationship between the vehicle frame and the road wheels.

The rear leveling valve 16 is mounted upon a side frame rail 20 of the vehicle chassis and is connected by means of an arm 23 and a link 24 to the rear axle housing 26 to be responsive to variations in the relationship between the vehicle frame and the rear road wheels. Each rear air spring 22 is mounted between the frame and a trailing arm 25 pivotally connected at its forward end to the frame rail 20 and at its rearward end to the axle.

As will be described more in detail later, each of the leveling valves 14 and 16 incorporates not only inlet and outlet valves for controlling the flow of air to and from the air springs, but also a control valve controlling the rate of this air flow. These control valves are actuated by means of air pressure supplied through control conduits 27. The control conduits 27 are supplied with air from the air storage tank 12 through a solenoid cutoff valve 28 arranged to be energized by the vehicle battery 29 when one of a plurality of switches 31 is closed. Each switch 31 is associated with a vehicle door, and may, in fact, be the existing courtesy light switch which normally functions to turn on a light when the door is opened. It will be seen that whenever a door is opened, one of the switches 31 will be closed and the solenoid valve 28 energized to open the solenoid valve and permit air to be supplied through the supply conduits 27 to the leveling valves.

The leveling valves 14 and 16 are similar, and one of the front valves 14 will be described in detail.

Referring now to Figures 2 to 5 inclusive, it will be seen that each leveling valve 14 comprises a valve housing 32 having an inlet port 33 connected to the air supply conduit 13 from the storage tank. The leveling valve also has an outlet port 34 connected to atmosphere, and a port 36 adapted to be connected to the adjacent air spring.

The leveling valve housing 32 incorporates a combined inlet and outlet valve to control the flow of air to the air spring from the air storage tank and the flow of air from the air spring to exhaust. A valve disc 37 is normally held upon its seat by means of a valve spring 38 to prevent the flow of air from the inlet port 33 to the passageway 36. The valve disc 37 is adapted to be raised from its seat by means of a valve plunger 39 reciprocably mounted within the valve housing and arranged to be reciprocated by means of a connection with a crank pin 41 eccentrically arranged on the actuating shaft 42, which in turn is connected to the end of the arm 18. It will be seen that when the valve plunger 39 is raised, air from the inlet port 33 passes around the valve disc 37 to the passageway 36 leading to the air spring.

When the valve plunger 39 is lowered, its upper end is spaced from the valve disc 37 to establish communication between the air spring passageway 36 and an axial passageway 43 extending through the valve plunger 39, thus connecting the air spring passageway 36 to the outlet port 34 to enable air to be exhausted from the spring.

It will be apparent from the foregoing that the rotation of the actuating shaft 42, in response to the changes in the relationship between the vehicle chassis and the adjacent road wheel, raises or lowers the valve plunger 39 to permit air to flow from the air storage tank to the air spring to raise the vehicle to its normal riding height after the load upon the vehicle has been increased and conversely to connect the air spring to exhaust to lower the vehicle to its normal height after the load upon the vehicle has been decreased.

As previously mentioned, the rate of air flow to and from the air spring is controlled by a control valve located between the inlet and outlet valves of the leveling valve assembly and the air spring. In the illustrated embodiment of the invention, this control valve is contained within the leveling valve housing, but it could be located in the conduit between the leveling valve and the air spring, or adjacent the air spring itself.

Figure 3:
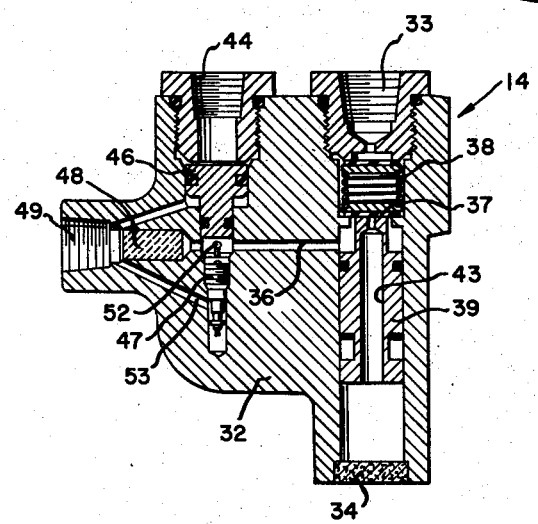
Figure 3 is a cross-sectional view through the leveling valve shown in Figure 2.
Figure 5:
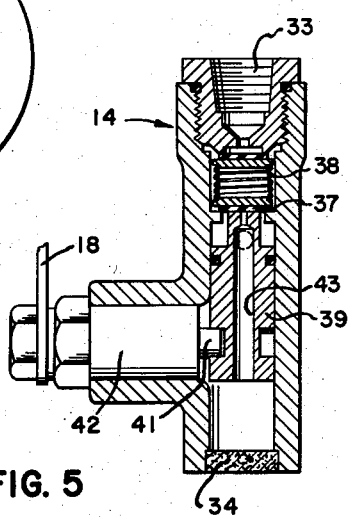
Figure 5 is a cross-sectional view taken on the line 5—5 of Figure 2.
Figure 4:
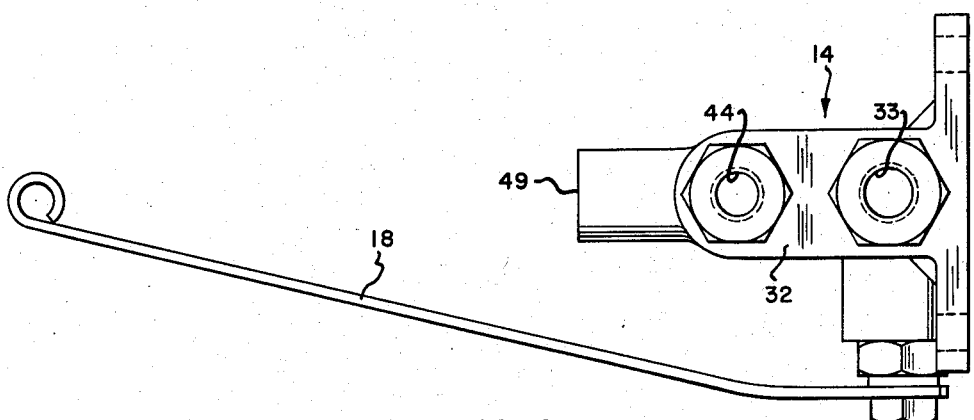
Figure 4 is a plan view of the leveling valve shown in Figures 2 and 3.

As best seen in Figure 3, the valve housing 32 has a control port 44 connected to the control conduits 27. Control air supplied to the port 44 acts upon a plunger 46 adapted to operate a control valve 47 arranged in axial alignment with the plunger. When all vehicle doors are closed, the solenoid valve 28 is deenergized and the control conduits 27 are cut off from the air storage tank 12, so that the plunger 46 will be inoperative as shown in Figure 3. Under these conditions, air flow to and from the air spring must pass through a filter element 48 arranged in the passageway 36 from the leveling valve to the air spring port 49 which is connected to the adjacent air spring by means of a conduit 51. The filter element 48 may be a porous ceramic or sintered bronze filter which will permit air flow only at a relatively slow rate. Continuous leveling at a slow rate is thus provided to slowly correct any improper car attitude.

When any door is opened, one of the switches 31 will be closed to energize the solenoid cutoff valve 28 and open the valve to permit air from the air storage tank 12 to flow through the control valve conduits 27 to the control port 44 of the leveling valve assembly. This control air acts upon the head of the plunger 46 to depress the latter and engage the valve stem 52 of the control valve 47 to open the latter. This permits air at a fast rate to flow through passageway 36, control valve 47 and passageway 53, thus bypassing the restriction provided by the filter element 48. Thus, any leveling which is called for by the ingress or egress of passengers may be rapidly accomplished simultaneously with the load change, and may usually be completed before the vehicle doors are all closed. Should the leveling not be completed, or should it be improper for some reason, the leveling may continue at a slow rate through the porous filter element 48 after the doors are closed.

It will be noted that the single control valve provided for each leveling valve controls not only the rate of air flow to the air spring during filling operations, but also the flow of air from the air spring during exhausting of the air spring. An open circuit can thus be conveniently used and the air exhausted directly to atmosphere without the necessity of providing a return line and a separate control valve to control the flow of exhaust air.

Figure 6:
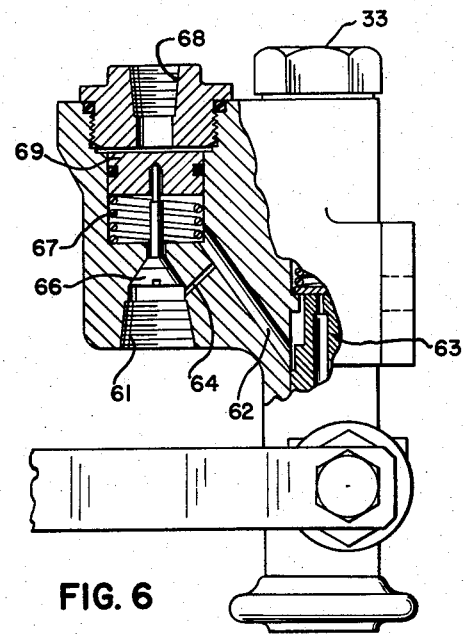
Figure 6 is an elevational view, partially broken away and in section, of a modified valve.

A modification of the control valve is shown in Figure 6. Here it will be noted that flow of air between the air spring port 61 and the passageway 62 from the leveling valve 63 may be either through a restricted passageway 64, or through a valve 66. The valve 66 is held in closed position by a spring 67 when the vehicle doors are all closed so that the rate of flow to and from the air spring is accomplished at a slow rate through the restricted passageway 64. When a door is opened and control air is supplied to the control port 68, it acts upon the head 69 of the valve to lift the latter from its seat to permit flow of air to and from the air spring at a fast rate.

Figure 7:
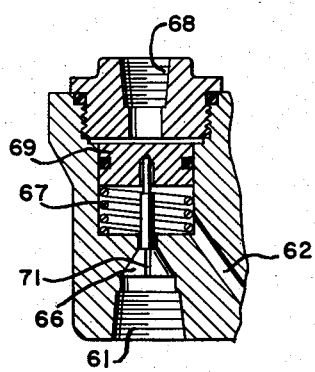
Figure 7 is a cross-sectional view similar to a portion of Figure 6, but showing another modification.

In a modification shown in Figure 7, the restriction 64 is replaced by a notch 71 provided in the head of the valve 66 to permit a slow air flow past the valve 66 even when the latter is in its closed position. If desired, the notch could be provided in the valve seat instead of the valve head.

In the illustrated embodiment of the invention, the control valve which controls the rate of air flow between each air spring and its leveling valve, is actuated by air pressure under the control of a solenoid cutoff valve. The invention contemplates the actuation of the control valve by other means, such as electrically or mechanically, in response to a signal from a vehicle door. Likewise, the control valve may be actuated in response to signals other than vehicle door position, such as in response to a manual control or an automatic control actuated by other vehicle components.

It will be understood that the invention is not to be limited to the exact construction shown and described, but that various changes and modifications may be made without departing from the spirit and scope of the invention, as defined in the appended claims.

What is claimed is:

1. In a motor vehicle having a sprung member and an unsprung member, an air spring resiliently connecting said members, a source of air pressure for said air spring, valve means shiftable between two positions for controlling the flow of air between said air source and said air spring at two different flow rates, a connection between said air source and said valve means, a solenoid operated valve in said connection, and a switch operated by the opening and closing of a door of said motor vehicle for controlling the energization of said solenoid and the supplying of air pressure to shift the position of said valve means.

2. In a motor vehicle having a sprung member and an unsprung member, an air spring resiliently connecting said members, a source of air pressure for said air spring, valve means shiftable between two positions for controlling the flow of air between said air source and said air spring at two different flow rates, air actuated means connected to said air source for shifting said valve means from one of said positions to the other of said positions, and a valve actuated in response to the position of a door of said motor vehicle controlling the connection between said air source and said air actuated means.

3. In a motor vehicle having a sprung member and an unsprung member, an air spring resiliently connecting said members, a source of air pressure for said air spring, leveling valve means responsive to variations in the relationship between said sprung and unsprung members to control the flow of air from said air source to said air spring and from said air spring to exhaust, control valve means in series with said leveling valve means to vary the rate of air flow to and from said air spring, means connecting said control valve means to said air source, a cutoff valve in said connecting means, and means responsive to the opening of a door of said motor vehicle to actuate said cutoff valve to actuate said control valve means to effect said flow variation.

4. In a motor vehicle having a chassis member and a plurality of road wheel members, an air spring for each of said road wheel members, a source of air pressure, a leveling valve for each of said air springs, each of said leveling valves having connections to said air source, to the associated air spring and to exhaust and being responsive to variations in the relationship between said chassis member and the associated road wheel member to control the flow of air between said connections to admit air into or exhaust air from said air spring, a control valve controlling the connection between each of said leveling valves and its associated air spring, each of said control valves being shiftable between one position restricting the flow of air through said last named connection to a slow rate and a second position opening said last named connection to permit a materially faster flow rate therethrough, a connection between said air source and each of said control valves, a solenoid controlled valve controlling said last mentioned connections, and a vehicle door operated switch for said solenoid valve.

5. In a motor vehicle having a chassis member and a road wheel member, an air spring between said members, a source of air pressure, a leveling valve, said leveling valve having connections to said air source, to said air spring and to exhaust and being responsive to variations in the relationship between said chassis member and said road wheel member to control the flow of air between said connections to admit air into or exhaust air from said air spring, a control valve controlling the connection between said leveling valve and said air spring, said control valve being shiftable between one position restricting the flow of air through said last named connection to a slow rate and a second position opening said last named connection to permit a materially faster flow rate therethrough, a connection between said air source and said control valve, a valve controlling said last mentioned connection, and means responsive to the opening of a vehicle door to actuate said last named valve to shift said control valve to said second position permitting a relatively fast filling or exhausting of said air spring when a vehicle door is open.

6. In a motor vehicle having a chassis member resiliently supported upon a wheel member by means of an air spring, and a source of air under pressure for said air spring, leveling control mechanism mounted upon one of said members, actuating means for said leveling control mechanism operatively connected to the other of said members to be responsive to variations in the relationship between said chassis member and said wheel member to maintain a predetermined relationship therebetween, said leveling control mechanism having a passage communicating with said air spring, said passage having a porous element therein permitting a relatively slow flow of air continuously therethrough, and means bypassing said porous element to permit air flow between said leveling control mechanism and said air spring at a considerably faster rate than permitted by said porous element.

7. In a motor vehicle having a chassis member resiliently supported upon a wheel member by means of an air spring, and a source of air under pressure for said air spring, leveling control mechanism mounted upon one of said members, actuating means for said leveling control mechanism operatively connected to the other of said members to be responsive to variations in the relationship between said chassis member and said wheel member to maintain a predetermined relationship therebetween, said leveling control mechanism having a passage communicating with said air spring, a valve controlling said passage, said valve having a head provided with a restricted opening therethrough to permit a continuous slow flow of air between said leveling control mechanism and said air spring when said valve is closed, and actuating means for said valve to open the latter and permit a considerably faster flow of air through said passageway.

8. In a motor vehicle having a chassis member resiliently supported upon a wheel member by means of an air spring, a source of air under pressure for said air spring, leveling control mechanism mounted upon one of said members, actuating means for said leveling control mechanism operatively connected to the other of said members to be responsive to variations in the relationship between said chassis member and said wheel member to maintain a predetermined relationship therebetween, means establishing communication between said leveling control mechanism and said air spring and having a constantly open restricted orifice therein, a bypass passageway in said means bypassing said restricted orifice to permit air flow between said leveling control mechanism and said air spring in both directions at a faster rate than permitted by said orifice alone, a valve normally closing said bypass passageway, an air connection from said air source to said valve, and means controlling said connection to admit air from said air source to said valve to open said valve and said bypass passageway to increase the rate of air flow to said air spring during the fill operation and to increase the rate of air flow from said air spring during the exhaust operation.

9. In a motor vehicle having a chassis member and a road wheel member, an air spring resiliently connecting said members, a source of air pressure, a leveling valve responsive to variations in the relationship between said chassis member and said road wheel member and having connections to said air source and to exhaust, a pair of parallel passageways connecting said leveling valve and said air spring, one of said passageways having a constantly open restricted orifice therein permitting air flow to or from said air spring whenever said leveling valve is actuated to fill or exhaust said air spring, a shut off valve controlling the other of said passageways, means normally closing said shut off valve to limit air flow to or from said air spring to that permitted through said restricted orifice, a closed air chamber having a connection to said air source, an actuating member connected to said shut off valve and reciprocable within said air chamber, and a control valve associated with said last named connection to selectively admit air from said source to said air chamber to act upon said actuating member and move said shut off valve to open position to permit air flow through said other passageway as well as through said restricted passageway to or from said air spring at a faster rate whenever said leveling valve is actuated to fill or exhaust said air spring.

10. The structure defined by claim 9 which is further characterized in that means are provided to open said control valve in response to the opening of a door of said motor vehicle to permit air flow to and from said air spring through both of said passageways.

References Cited in the file of this patent
UNITED STATES PATENTS

| | | |
|---|---|---|
| 955,059 | Duncan | Apr. 12, 1910 |
| 1,666,748 | Michley | Apr. 17, 1928 |
| 2,787,475 | Jackson | Apr. 2, 1957 |
| 2,848,249 | Bertsch | Aug. 19, 1958 |